United States Patent [19]
West

[11] Patent Number: 5,175,957
[45] Date of Patent: Jan. 5, 1993

[54] SLIDING TUBE RODENT TRAP

[76] Inventor: Leonard V. West, Hwy. 36 E., Rte. 2, Box 198, Macon, Mo. 63552

[21] Appl. No.: 895,095

[22] Filed: Jun. 8, 1992

Related U.S. Application Data

[63] Continuation-in-part of Ser. No. 800,433, Nov. 29, 1991, abandoned.

[51] Int. Cl.⁵ .......................................... A01M 23/02
[52] U.S. Cl. ............................................ 43/61; 43/85
[58] Field of Search ............... 43/61, 77, 85, 78, 91, 43/93, 62

[56] References Cited

U.S. PATENT DOCUMENTS

| | | | |
|---|---|---|---|
| 1,587,536 | 6/1926 | Lobit | 43/61 |
| 4,127,958 | 12/1978 | Peters et al. | 43/81 |
| 4,231,180 | 11/1980 | Bare | 43/61 |
| 4,291,486 | 9/1981 | Lindley | 43/62 |
| 4,769,942 | 9/1988 | Copenhaver, Sr. | 43/61 |
| 4,949,499 | 8/1990 | Lindros, Jr. | 43/61 |
| 5,005,313 | 4/1991 | Lindros, Jr. | 43/61 |
| 5,044,111 | 9/1991 | Lindros, Jr. | 43/61 |

Primary Examiner—Richard K. Seidel
Assistant Examiner—Jeanne M. Elpel
Attorney, Agent, or Firm—Litman, McMahon & Brown

[57] ABSTRACT

A trap for killing small animals comprising a first trap member and a second trap member slidingly advanceable relative to one another between a set or open alignment and a closed alignment. The trap members are baisingly urged toward said closed alignment by biasing means. The first trap member including means forming a first animal engaging edge and the second trap member including means forming a second animal engaging edge such that when the trap members are positioned in the open alignment the animal engaging edges form a trap opening. The trap includes set and trigger means for maintaining the trap members in the open alignment until engagement or activation of the set and trigger means by an animal to be trapped. The trap opening is positioned relative to the set and trigger means such that when the set and trigger means is activated by an animal the biasing means is allowed to advance the trap members toward the closed alignment such that the animal engaging edges are advanced toward one another so as to constrict the animal positioned therebetween.

12 Claims, 2 Drawing Sheets

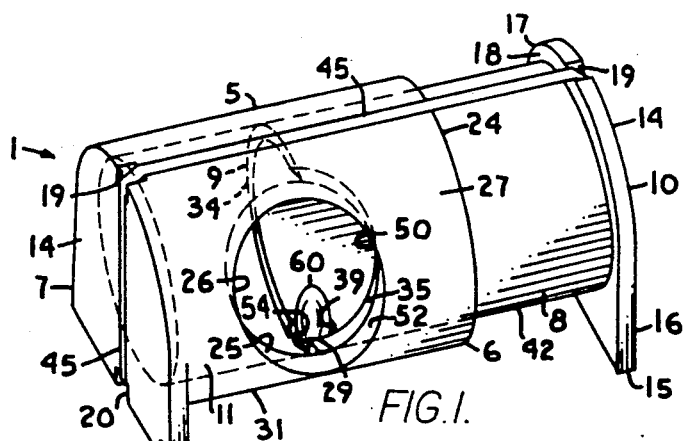
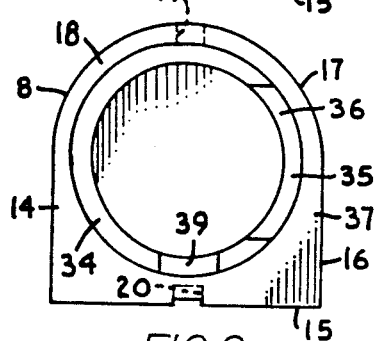
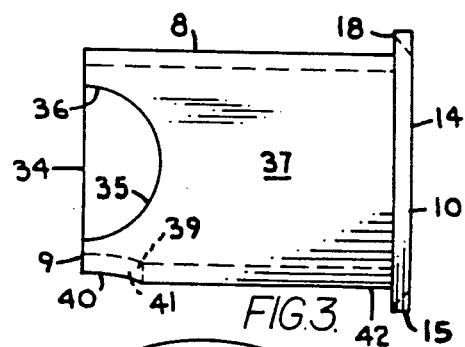
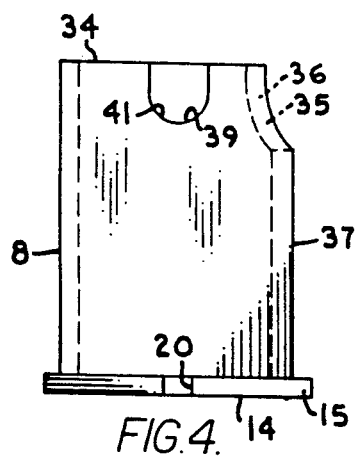
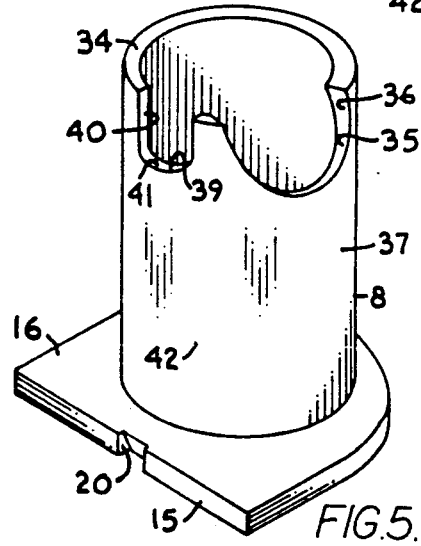
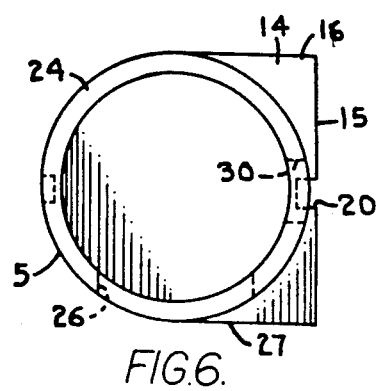
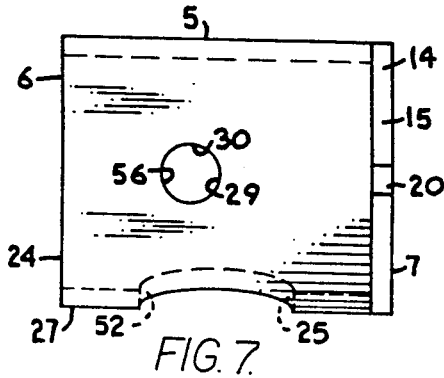

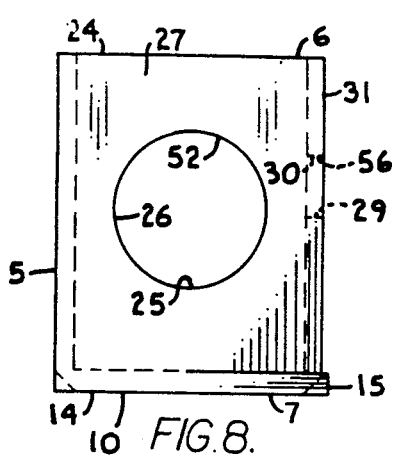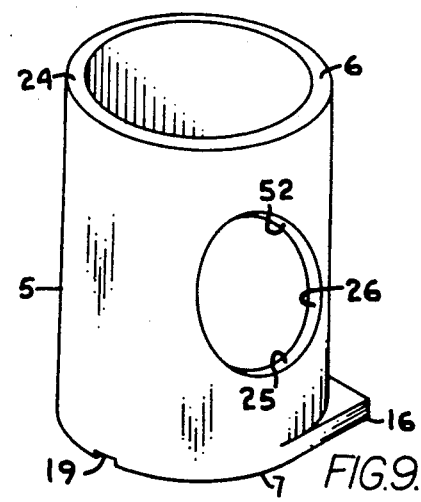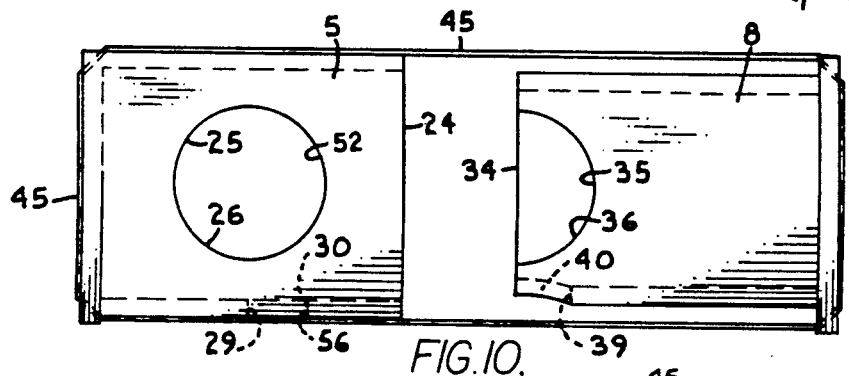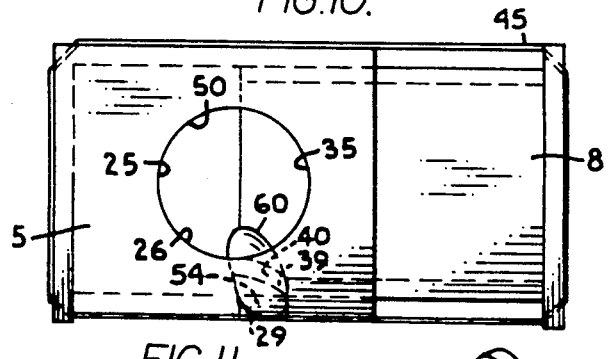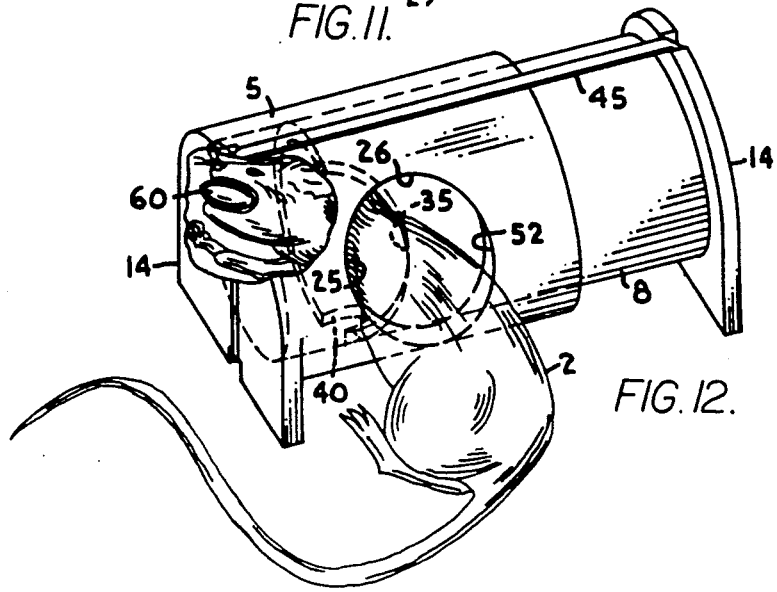

5,175,957

SLIDING TUBE RODENT TRAP

CROSS-REFERENCE TO RELATED APPLICATION

This application is a Continuation-In-Part of application Ser. No. 07/800,433 filed Nov. 29, 1991, now abandoned.

BACKGROUND OF THE INVENTION

The present invention generally relates to traps for animals and more specifically traps designed to kill small rodents.

Numerous devices and chemical compounds have been developed for the removal and extermination of small rodents. Although many of these devices and compounds are generally effective at killing or trapping rodents, they suffer from various shortcomings.

The spring-biased lever arm type trap is probably the most familiar rodent trap available. A spring urges a lever arm from a set position to a closed position when a rodent moves a trigger mechanism having bait secured thereto. The spring is generally designed to impart enough force on the lever arm to crush the rodent between the lever arm and a base of the trap. The lever arm type traps are often difficult to set without injuring the person setting the trap, they are dangerous to children and household pets and it is often difficult to remove the crushed rodent from the trap without having to touch the rodent.

Chemical compounds designed to kill rodents are also potentially dangerous to household pets and small children. In addition, increased environmental awareness and health concerns among consumers limits the desirability of these products.

Many live traps have been developed that are designed to capture a rodent without killing it. One type of live traps comprises slidable, interfitting tubes or members biased toward each other axially. When the traps are set in an open position a trap opening provides access to a trap chamber within the interfitting members. When a rodent takes the bait a trigger mechanism causes the members to advance toward one another so as to close the trap opening and trap the rodent therein. Many of these type traps are designed to be disposable such that when a rodent is caught the trap with the rodent therein is disposed. Such disposable traps are wasteful and expensive where multiple rodents must be caught. If the trap is designed for reuse, the traps are not designed to facilitate release of the live rodent.

SUMMARY OF THE INVENTION

The present invention comprises an animal trap formed from a first and a second trap member slidingly advanceable relative to one another from an open alignment to a closed alignment. The first trap member includes means forming a first animal engaging edge and the second trap member includes means forming a second animal engaging edge. When the first trap member and the second trap member are advanced to the open alignment, the first animal engaging edge and the second animal engaging edge cooperate to form a trap opening.

The trap includes biasing means such as a rubber band for biasingly urging the first trap member and the second trap member from the open alignment toward the closed alignment. The trap also includes set and trigger means for maintaining the first and second trap members in the open alignment against the biasing of the biasing means until the set and trigger means is engaged or activated by an animal to be trapped whereupon the first and second trap members are allowed to advance toward the closed alignment.

The trap opening provides access to the set and trigger means when the first trap member and the second trap member are positioned in the open alignment. The set and trigger means are positioned relative to the trap opening such that when an animal to be trapped activates the set and trigger means to allow the first and second trap members to advance toward the closed alignment, the first animal engaging edge and the second animal engaging edge are advanced toward one another such that the shear force from the sliding trap members constricts or asphyxiates the animal positioned therebetween.

OBJECTS AND ADVANTAGES OF THE INVENTION

Therefore it is an object of this invention: to build a better mousetrap; to provide such a trap that is designed to kill an animal which is caught; to provide such a trap that is designed to kill such an animal by constriction; to provide such a trap that is relatively safe to household pets and small children; to provide such a trap that is not toxic; to provide such a trap that is relatively easy to set; to provide such a trap that may be powered by a rubber band; to provide such a trap that is adapted to use bait that is relatively readily available, to provide such a trap wherein it is relatively easy to remove an animal carcass therefrom; to provide such a trap wherein an animal carcass can be removed from the trap without a need to touch the carcass; to provide such a trap that is relatively inexpensive to manufacture, to provide such a trap that is particularly well suited for its intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of the trap of the present invention showing an inner hollow trap member positioned in an open alignment relative to an outer hollow trap member.

FIG. 2 is an inside end elevational view of the inner hollow trap member of the trap shown separated from the outer hollow trap member.

FIG. 3 is a side elevational view of the inner hollow trap member.

FIG. 4 is a bottom plan view of the inner hollow trap member rotated 90° from the orientation shown in FIG. 3.

FIG. 5 is a perspective view of the inner hollow trap member shown resting on an outer end thereof.

FIG. 6 is an inside end elevational view of the outer hollow trap member shown separated from the inner hollow trap member and rotated 90° from the orientation shown in FIG. 1.

FIG. 7 is a bottom plan view of the outer hollow trap member rotated 180° from the orientation shown in FIG. 1.

FIG. 8 is a side elevational view of the outer hollow trap member rotated 90° from the orientation shown in FIG. 1.

FIG. 9 is a perspective view of the outer hollow trap member as shown in FIG. 8.

FIG. 10 is a front elevation of the trap with the inner hollow trap member positioned beyond the open alignment.

FIG. 11 is a front elevation of the trap in the set position.

FIG. 12 is a perspective view of the trap showing the inner hollow trap member and the outer hollow trap member advanced toward a closed alignment so as to trap a rodent.

DETAILED DESCRIPTION OF THE INVENTION

As required, detailed embodiments of the present invention are disclosed herein; however, it is to be understood that the disclosed embodiments are merely exemplary of the invention, which may be embodied in various forms Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally refers to an animal trap of the present invention designed to trap and kill small animals 2 such as mice and rats. The animal trap 1 comprises two interfitting hollow trap members, an outer hollow trap member 5 having an open end 6 and a closed end 7 and an inner hollow trap member 8 having an open end 9 and a closed end 10. The inner hollow trap member 8 is slidingly received within the outer hollow trap member 5 in coaxial alignment. More specifically, the open end 9 of the inner hollow trap member 8 extends into the open end 6 of the outer hollow trap member 5 such that the inner hollow trap member 8 and the outer hollow trap member 5 generally form an enclosed trap chamber 11.

The outer hollow trap member 5 and the inner hollow trap member 8 are preferably of circular cross section and the outer diameter of the inner hollow trap member 8 is preferably only slightly less than the inner diameter of the outer hollow trap member 5. It is foreseen that the cross section of the outer and inner hollow trap members 5 and 8 could be of various alternative shapes including but not limited to triangular, rectangular, polygonal and ovate.

The outer hollow trap member 5 and the inner hollow trap member 8 each include an endpiece 14. The endpieces 14 of the hollow trap members 5 and 8 extend across the closed ends 7 and 10 respectively. Each endpiece 14 includes a flat lower surface 15 extending below the respective hollow trap member 5 and 8 such that each endpiece 14 functions as a support leg or base member 16 adapted to be positioned on a flat surface such as a floor and to support the inner and outer hollow trap members 8 and 5 thereabove. An outer edge 17 of the inner hollow trap member 8 endpiece 14 extends beyond the outer diameter of the inner hollow trap member 8 so as to define a shoulder 18. Additionally, an upper notch 19 and a lower notch 20 is formed in each endpiece 14.

The open end 6 of the outer hollow trap member 5 is defined by an open end edge 24. The outer hollow trap member 5 also includes first structural means forming a first animal engaging edge 25 such as first opening or hole 26 located on a front side 27 of the outer hollow trap member 5. The outer hollow trap member 5 further includes third structure means forming a first bait engaging edge 29 such as second opening or hole 30 located on an underside 31 of the outer hollow trap member 5.

The open end 9 of the inner hollow trap member 8 is similarly defined by an open end edge 34. The inner hollow trap member 8 includes second structural means forming a second animal engaging edge 35 such as semicircular cutout portion 35 generally continuous with and extending inward from the open end edge 34 into a front side 37 of the inner hollow trap member 8. The radius of the first animal engaging edge 25 closely approximates the radius of the second animal engaging edge 35. The inner hollow trap member 8 further includes fourth structure means forming a second bait engaging edge 39 such as slot 40 with semicircular inner end edge 41. The slot 40 is generally continuous with and extends inward from the open end edge 34 into an underside 42 of the inner hollow trap member 8. The radius of the second bait engaging edge 39 closely approximates the radius of the first bait engaging edge 29.

The inner hollow trap member 8 is slidingly advanceable within the outer hollow trap member 5 such that the inner hollow trap member 8 and the outer hollow trap member 5 may be slidingly advanced relative to one another between a set or open alignment and a closed alignment. In the closed alignment, the inner hollow trap member 8 extends almost completely within the outer hollow trap member 5 such that the open end edge 24 of the outer hollow trap member 5 engages the shoulder 18 of the inner hollow trap member 8. In the open alignment, the hollow trap members 5 and 8 are generally advanced away from one another.

The trap 1 further includes biasing means such as rubber band 45 for biasingly urging the hollow trap members 5 and 8 from the open alignment to the closed alignment. As can be seen in FIG. 1, the rubber band 45 is secured in the upper and lower notches 19 and 20 of the endpieces 14 and extends from the closed end 7 of the outer hollow trap member 5 to the closed end 10 of the inner hollow trap member 8.

When the hollow trap members 5 and 8 are positioned in the open alignment, the first opening 26 in the outer hollow trap member 5 is positioned relative to and cooperates with the semicircular cutout portion 36 in the inner hollow trap member 8 to form a trap access opening 50. In this open alignment, the first animal engaging edge 25 of the outer hollow trap member 8 is positioned opposite of and spaced from the second animal engaging edge 35 of the inner hollow trap member 8, and the second animal engaging edge 35 is generally positioned adjacent to and aligned with a front edge 52 of the first opening 26 of the outer member 5.

Similarly, when the hollow trap members 5 and 8 are positioned in the open alignment, the second opening 30 in the outer hollow trap member 5 is positioned relative to and cooperates with the slot 40 in the inner hollow trap member 8 to form bait receiving means such as bait receiving opening 54. In this open alignment, the first bait engaging edge 29 of the outer hollow trap member 8 is positioned opposite of and spaced from the second bait engaging edge 39 of the inner hollow trap member 8 and the second bait engaging edge 39 is generally positioned adjacent to and aligned with a front edge 56 of the second opening 30 of the outer hollow trap member 5.

When the hollow trap members 5 and 8 are positioned in the open alignment, the bait receiving opening 54 is adapted to receive bait 60. The preferred bait 60 is a shelled peanut and the bait receiving opening 54 is generally sized to receive a standard sized shelled peanut.

To set the trap 1, the inner hollow trap member 8 is pulled to the set position and the bait 60 is positioned in the bait receiving opening 54 such that when the inner hollow trap member 8 is released, the first bait engaging edge 29 of the outer hollow trap member 5 and the second bait engaging edge 39 of the inner hollow trap member 8 engage the bait 60 on opposite sides which prevents the inner hollow trap member 8 and the outer hollow trap member 5 from being advanced toward the closed alignment by the rubber band 45. The bait 60 holds the first and second bait engaging edges 29 and 39 in spaced relation and in turn holds the first and second animal engaging edges 25 and 35 in spaced relation and holds the inner and outer hollow trap members 8 and 5 in the open alignment.

When the bait 60 is removed from between the first and second bait engaging edges 29 and 39, the open end edge 34 of the inner hollow trap member 8 is advanced toward the closed end 7 of the outer hollow trap member 5 such that the first animal engaging edge 25 of the inner hollow trap member 8 advances at least partially across the trap access opening 50 toward the second animal engaging edge 35 to cooperate therewith in trapping an animal between the edges 25 and 35. In general, the cooperation of the bait 60 with the first bait engaging edge 29 and the second bait engaging edge 39 functions as set and trigger means for maintaining the inner hollow trap member 8 and the outer hollow trap member 5 in the open alignment against the biasing of the rubber band 45 when the bait 60 is positioned in the bait receiving opening 54 and for allowing the rubber band 45 to advance the inner hollow trap member 8 and the outer hollow trap member 5 toward the closed alignment upon activation or triggering of the set and trigger means by removal of the bait 60 from the bait receiving opening 54 by the animal 2 to be trapped.

When the inner hollow trap member 8 is positioned in the open alignment, the trap access opening 50 provides access to the trap chamber 11. The bait receiving opening 54 is positioned relative to the trap access opening 50 such that the animal 2 may reach the bait 60 positioned in the bait receiving opening 54 by inserting only a portion of its body, preferably the head, through the trap access opening 50 and into the trap chamber 11. In particular, the bait receiving opening 54 is preferably positioned directly in front of the trap access opening 50 in the underside 31 of the outer hollow trap member 5. The outer hollow trap member 5 is generally sized such that the distance between the bait receiving opening 54 in the underside 31 of the outer hollow trap member 5 and the trap access opening 25 on a front side 26 of the outer hollow trap member 5 is approximately equal to or slightly greater than the average length of the head of the type of animal 2 to be trapped.

When the animal 2 removes the bait 60, the inner hollow trap member 8 and the outer hollow trap member 5 advance toward the closed alignment such that the first animal engaging edge 25 and the second animal engaging edge 35 are advanced toward one another so as to engage and constrict the animal 2 positioned therebetween. The first and second animal engaging edges 25 and 35 generally engage the animal 2 around the neck or upper torso. The rubber band 45 selected for use should be of sufficient strength to prevent reopening of the trap 1 by the animal 2 and preferably strong enough to constrict and suffocate or asphyxiate the animal 2.

It is foreseen that various forms of the present invention could be used. In particular, it is foreseen that one or both of the trap members 5 and 8 would not have to be hollow. A solid, plunger-like trap member could be substituted for the inner hollow trap member 8 and an inner end edge of the solid, plunger-like trap member would function as the second animal engaging edge 35 and the second bait engaging edge 39. In addition, flat plates could be substituted for the inner hollow trap member 8 and the outer hollow trap member 5 wherein the plates are positioned one in front of the other and are slidingly advanceable relative to one another between an open alignment and a closed alignment. One plate would include first structural means forming the first animal engaging edge 25 and the other would include second structural means forming the second animal engaging edge 35. Such a trap 1 would also include biasing means, set and trigger means and enclosure means for preventing access to bait positioned in the set and trigger means when the trap is positioned in the open alignment except through the trap access opening 50 formed by the first animal engaging edge 25 and the second animal engaging edge 35.

It is also foreseen that the first and second animal engaging edges 25 and 35 and the first and second bait engaging edges 29 and 39 could be formed by various means. Both animal engaging edges 25 and 35 and both bait engaging edges could be formed by openings, holes, slots, or cutout portions in the trap members 5 and 8. These openings, holes, slots or cutout portions could be of various shapes including circular, ovate, triangular, rectangular and polygonal. In addition the first bait engaging edge 29 in the outer hollow trap member 5 could be formed by a depression, groove, channel or indentation in the outer hollow trap member 5. One of the animal engaging edges 25 or 35 and one of the bait engaging edges 29 or 39 could simply comprise a planar open end edge 24 or 34 of the trap member 5 or the trap member 8.

It is further foreseen that various set and trigger means could be used for the present invention. It is foreseen that set and trigger means could be used wherein the bait 60 would not be used to maintain the trap members 5 and 8 in the open alignment such that removal of the bait 60 would allow the trap members 5 and 8 to advance to the closed alignment. Set and trigger means could be used wherein movement of the set and trigger means without having to remove the bait 60 would allow the trap members 5 and 8 to advance to the closed alignment.

Additionally, it is foreseen that the biasing means could comprise a spring.

It is to be understood that while certain forms of the present invention have been illustrated and described herein, it is not to be limited to the specific forms or arrangement of parts described and shown.

What is claimed and desired to be secured by Letters Patent is as follows:

1. An animal trap, comprising:
   (a) a first trap member having first structural means forming a first animal engaging edge;
   (b) a second trap member having second structural means forming a second animal engaging edge; said first trap member and said second trap member being slidable relative to one another such that said first trap member and said second trap member are slidingly advanceable between an open alignment and a closed alignment thereof, and when said first trap member and said second trap member are advanced to said open alignment, said first animal engaging edge and said second animal engaging edge are spaced apart and cooperate to form a trap opening;
   (c) biasing means for biasing said first trap member and said second trap member from said open alignment to said closed alignment;
   (d) set and trigger means for maintaining said first trap member and said second trap member in said open alignment against the biasing of said biasing means and being triggerable to allow said biasing means to advance said first trap member and said second trap member toward said closed alignment upon activation of said set and trigger means by an animal to be trapped;
   (e) said trap opening providing access to said set and trigger means to allow an animal to trigger said set and trigger means when said first trap member and said second trap member are positioned in said open alignment; and
   (f) said set and trigger means positioned relative to said trap opening such that when an animal to be trapped activates said set and trigger means said biasing means advances said first trap member and said second trap member toward said closed alignment whereby said first animal engaging edge and said second animal engaging edge are advanced toward one another and constrict the animal positioned therebetween.

2. The animal trap as disclosed in claim 1 wherein:
   (a) said biasing means comprise a rubber band.

3. The animal trap as disclosed in claim 1 further comprising:
   (a) means for preventing access to said set and trigger means when said first and second trap members are in said open alignment except through said trap opening.

4. An animal trap, comprising:
   (a) a first trap member having first structural means forming a first animal engaging edge;
   (b) an second trap member having second structural means forming a second animal engaging edge; said first trap member and said second trap member being advanceable relative to one another such that said first trap member and said second trap member are slidingly advanceable between an open alignment and a closed alignment; and, when said first trap member and said second trap member are advanced to said open alignment, said first animal engaging edge and said second animal engaging edge are spaced apart and cooperate to form a trap opening therebetween;
   (c) biasing means for biasing said first trap member and said second trap member from said open alignment to said closed alignment;
   (d) bait receiving means for receiving a bait when said first trap member and said second trap member are positioned in said open alignment whereby the bait positioned in said bait receiving means prevents said first trap member and said second trap member from advancing toward said closed alignment;
   (e) said trap opening providing access to the bait positioned in said bait receiving means when said first trap member and said second trap member are positioned in said open alignment; and
   (f) said bait receiving means are positioned relative to said trap opening such that, when an animal to be trapped removes the bait from said bait receiving means, said biasing means advance said first trap member and said second trap member toward said closed alignment whereby said first animal engaging edge and said second animal engaging edge are advanced toward one another and constrict the animal positioned therebetween.

5. The animal trap as disclosed in claim 4 wherein:
   (a) said biasing means comprises a rubber band.

6. The animal trap as disclosed in claim 4 further comprising:
   (a) enclosure means for preventing access to the bait positioned in the bait receiving opening when said first and second trap members are in said open alignment except through said trap opening.

7. The animal trap as disclosed in claim 4 wherein said bait receiving means comprise:
   (a) third structural means forming a first bait engaging edge on said first trap member; and
   (b) fourth structural means forming a second bait engaging edge on said second trap member such that, when said first trap member and said second trap member are positioned in said open alignment, said first bait engaging edge and said second bait engaging edge cooperate to form a bait receiving opening adapted to hold the bait such that, when said first and second bait engaging edges engage the bait, said first and second bait engaging edges are held in spaced relation and in turn hold said first and second animal engaging edges in spaced relation and hold said first and second trap members in said open alignment whereby said first and second trap members are prevented from advancing to said closed alignment until the bait is removed from between said first and second bait engaging edges.

8. An animal trap, comprising:
   (a) an outer hollow trap member having first structural means forming a first animal engaging edge;
   (b) an inner hollow trap member having second structural means forming a second animal engaging edge; said inner hollow member being slidingly received relative to said outer hollow member whereby said inner hollow trap member and said outer hollow trap member are advanceable between an open alignment and a closed alignment such that, when said inner hollow trap member and said outer hollow trap member are advanced to said open alignment, said first animal engaging edge and said second animal engaging edge cooperate to form a trap opening;
   (c) biasing means for biasing said inner hollow trap member and said outer hollow trap member from said open alignment toward said closed alignment;
   (d) bait receiving means for receiving bait when said inner hollow trap member and said outer hollow trap member are positioned in said open alignment such that the positioning of the bait in said bait receiving means prevents said inner hollow trap member and said outer hollow trap member from advancing toward said closed alignment;

(e) said trap opening providing access to the bait positioned in said bait receiving means when said inner hollow trap member and said outer hollow trap member are positioned in said open alignment; and (f) said bait receiving means positioned relative to said trap opening such that, when an animal to be trapped removes the bait from said bait receiving means, said biasing means advances said inner hollow trap member and said outer hollow trap member toward said closed alignment whereby said first animal engaging edge and said second animal engaging edge advance toward one another and constrict the animal positioned therebetween.

9. The animal trap as disclosed in claim 8 wherein:
(a) said biasing means comprise a rubber band.

10. The animal trap as disclosed in claim 8 further comprising:
(a) enclosure means for preventing access to the bait positioned in said bait receiving means when said inner hollow trap member and said outer hollow trap member are positioned in said open alignment except through said trap opening.

11. The animal trap as disclosed in claim 8 wherein said bait receiving means comprises:
(a) third structural means forming a first bait engaging edge on said outer hollow trap member; and
(b) fourth structural means forming a second bait engaging edge on said inner hollow trap member such that when said inner hollow trap member and said outer hollow trap member are positioned in said open alignment said first bait engaging edge and said second bait engaging edge cooperate to form a bait receiving opening into which the bait may be positioned such that said first and second bait engaging edges engage the bait and are prevented from advancing to said closed alignment until the bait is removed from between the first and second bait engaging edges.

12. The trap as disclosed in claim 8 wherein:
(a) said trap opening is formed on a front side of said trap; and
(b) said bait receiving opening is formed on an underside of said trap and the distance between said trap opening and said bait receiving opening closely approximates the average length of a head of the type of animal to be trapped using the trap.

* * * * *